May 1, 1951     DA RIN DELLA MORA VITTORIO     2,551,072
WATER COCK APPLICABLE TO SINKS, FOUNTAINS, AND THE LIKE
Filed Feb. 5, 1948
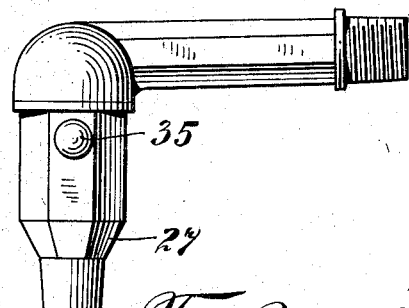
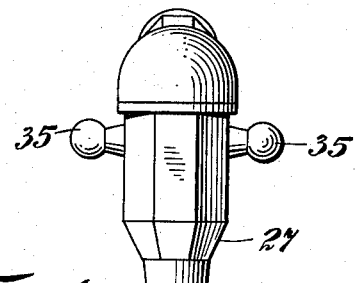
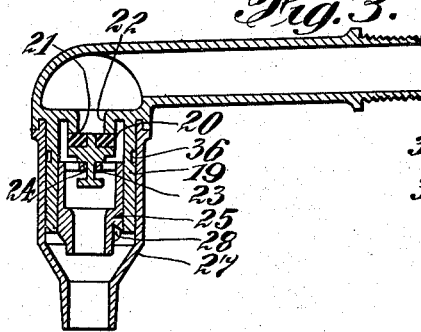
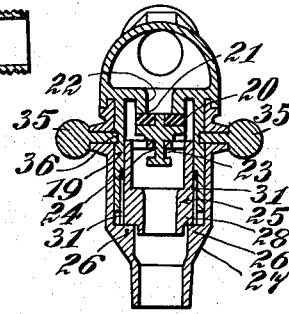
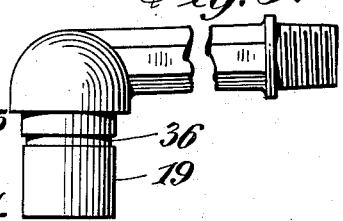
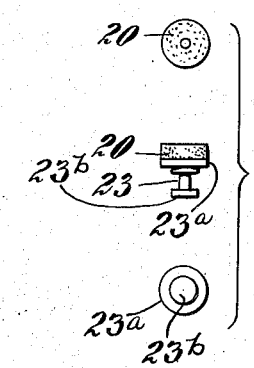
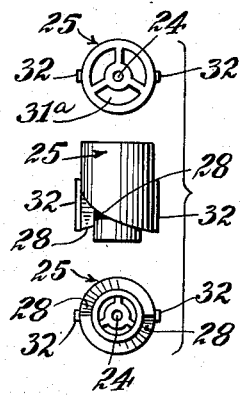
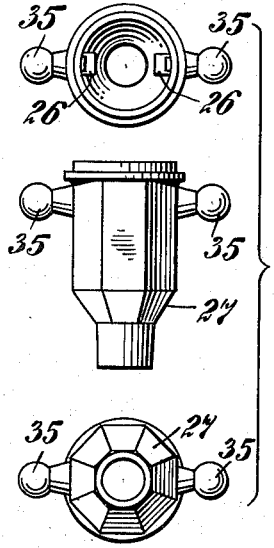
INVENTOR.
Da Rin della Mora Vittorio
BY C. P. Goepel
ATTORNEY Patented May 1, 1951

2,551,072

UNITED STATES PATENT OFFICE 2,551,072

WATER-COCK APPLICABLE TO SINKS, FOUNTAINS, AND THE LIKE

Da Rin della Mora Vittorio, Belluno, Italy, assignor to Elvio Darin, College Point, N. Y.

Application February 5, 1948, Serial No. 6,435
In Italy August 6, 1947

1 Claim. (Cl. 251—8)

Subject matter of the present invention is a cock which, for the simplicity of its construction, assures a long durability of working.

The invention consists of an inner casing member supported by the supply pipe which has an external circumferential groove, and internal vertically disposed guideways or slots, with a portion constricted to form a valve seat, a vertically movable piston provided with external cam surfaces and external diametrically opposite pins to engage said guideways, and having a constricted part provided with an opening, a valve having a stem, one part of which engages the constricted opening of the inner casing and the other part of which engages the constricted opening of said piston, and supports a resilient member to engage the inner casing, an outer casing having a member in the form of a pin insert, the inner end portion and outer end portion of the insert being in combination with the outer casing, the inner end portion of which is adapted to engage the circumferential groove of the inner casing to be supported thereby, and the outer end portion is adapted to act as a handle to rotate the outer casing on the inner casing, said outer casing having a discharge opening and inwardly extending followers to ride on the cams of the piston, whereby when the outer casing is rotated in one direction the resilient member closes the water passage, and when rotated in the opposite direction opens the passage.

The invention is further described in the following specification, shown in the drawings and finally pointed out in the claim.

In the accompanying drawings,

Fig. 1 is a side external view of an embodiment;

Fig. 2 is a front view;

Fig. 3 is a central section of Fig. 1;

Fig. 4 is a central section of Fig. 2;

Fig. 5 is a side view of the inner casing and the supply pipe;

Fig. 6 is a spaced top, side and bottom view of the valve.

Fig. 7 is a spaced top, side and bottom view of the piston; and

Fig. 8 is a spaced top, side and bottom view of the outer casing.

Similar characters of reference indicate corresponding parts throughout the various views.

In Fig. 5 is shown a metallic pipe ending at one part with the usual outside constant thread fitting for water piping and at the other part with a hollow spherical bowl shaped thickness with a depending hollow cylindrical shaped part 19 of larger diameter and having an outside groove 36. On its inner lower part, it has two small vertical grooves 31 which act as guides for the projections 32 of the member 25 shown in Fig. 7. This member 25 is a small cylinder with a metallic plate having a small central hole 24 for the passage of the flanged pin 23 having a rubber washer 20 (Fig. 6), and preferably three arcuate slots for the passage of the water. The pin 23 has a flange 23a for the washer and a flange 23b. The member 27 (Fig. 8) is a faceted hollow cylinder, with reduced lower end for the passage of the water. On its inside (Fig. 4), two metallic shoulders 26 extend inwardly. Two small screw pins, are supported by the member 27, the inner ends of which engage the groove 36 of the member 19, and the outer ends of which act as handles 35. When the two handles 35 are given a rotary motion, counterclockwise, the two shoulders 26 move along the two lower helicoidal surfaces of the member 25 (Fig. 7), which is unable to rotate in consequence of the two guides 32, in their corresponding grooves 31, and the member 25 is forced to have a vertical movement in a downward direction by the water pressure acting on the washer means 20. With this movement the resilient washer 20 cannot shut the opening of the small cylindrical flange 22 inside of the extension 19, and so the water coming from the piping with its natural pressure passes through the arcuate slots 31a of the member 25, and finally discharges from the lower end of the member 27. When the two handles 35 are given a rotary motion, in a contrary direction, the shoulders 26 of the same piece are forced to run along the two helicoidal surfaces of the member 25, which, unable to rotate in consequence of its two guides 32 entering the grooves 31 is caused to travel in an upward direction, and with it moves the resilient washer 20 connected to the member 25. This movement closes the orifice of the cylindrical flange 22, the resilient washer being pressed against the flange 22.

The cock, in its simplicity, is easily constructed, and assures the durability of all its pieces. For this reason, it can be built also with material of inferior quality assuring its durability. It has no springs of any kind, no screws, that is, no piece easily liable to alterations. It is easy in its dismounting it being only necessary to screw off the two handles 35 of the piece 27. (Fig. 8.) It is applicable to sinks, fountains and the like, and is capable of replacing with advantages of durability and of simplicity, the cocks now in use.

I wish to be understood that I do not desire to be limited to the exact details of construction shown and described, for obvious modifications will occur to a person skilled in the art.

I claim:

In a water-cock applicable to sinks, fountains and the like, the combination of a hollow inner casing member of cylindric exterior and interior, forming part of and depending from a supply pipe, said casing having an external circumferential groove, and internal vertically disposed guideways at its lower portion, and a dependent cylindrical flange forming an orifice and constructed to form a valve seat at the upper portion of the inner casing, a vertically movable cylindrical piston provided at its lower surface with external helicoidal cam surfaces and external diametrically opposite radially outwardly disposed guide members to engage said guideways of the inner casing, and having an inwardly extending part provided with openings and a central opening, a resilient valve adapted to engage the cylindrical flange of the inner casing forming the valve seat, a central stem for said valve extending downwardly through the opening of said part of said piston, and an outer casing having a cylindrical interior and having an insert with an inner end portion and an outer end portion, the inner end portion engaging the circumferential groove of the inner casing to be supported thereby, and the outer end portion adapted to act as a handle to rotate the outer casing on the inner casing, said outer casing having a water discharge opening at its lower end and having inwardly extending diametrically opposite abutments for supporting the cams of the piston, whereby when the outer casing is rotated in one direction, the piston moves in one direction by the water pressure in the supply pipe, and the valve opens the water passage orifice of the flange of the inner casing, and when rotated in the opposite direction, the piston moves in the opposite direction the valve closing said orifice, the valve moving with the piston, upwardly or downwardly, the disengagement of the inner end portion of the insert from its groove, permitting the removal of the outer casing, with its piston and valve supported thereby, from the inner casing.

DA RIN DELLA MORA VITTORIO.

REFERENCES CITED

The following references are of record in the file of this patent:

UNITED STATES PATENTS

| Number | Name | Date |
| --- | --- | --- |
| 17,539 | Burnham | June 9, 1857 |
| 232,709 | Gruber | Sept. 28, 1880 |
| 649,457 | Howes | May 15, 1900 |
| 988,943 | Lentz | Apr. 4, 1911 |
| 1,133,521 | Woodman | Mar. 30, 1915 |
| 1,269,213 | Power | June 11, 1918 |
| 1,551,758 | Lehr | Sept. 1, 1925 |
| 1,759,904 | Kass | May 27, 1930 |
| 2,179,165 | Sifkovitz | Nov. 7, 1939 |